United States Patent
Deng et al.

(10) Patent No.: US 10,745,218 B2
(45) Date of Patent: Aug. 18, 2020

(54) FEEDING SYSTEM

(71) Applicants: Tyco Electronics (Shanghai) Co. Ltd., Shanghai (CN); TE Connectivity Corporation, Berwyn, PA (US); Kunshan League Automechanism Co., Ltd., Kunshan (CN); Tyco Electronics Polska Sp. z.o.o., Warsaw (PL)

(72) Inventors: Yingcong Deng, Shanghai (CN); Jaroslaw Kowalski, Bydgoszcz (PL); Andrzej Przybylski, Bydgoszcz (PL); Jaroslaw Grzebski, Bydgoszcz (PL); Dandan Zhang, Shanghai (CN); Lvhai Hu, Shanghai (CN); Fengchun Xie, Shanghai (CN); Yun Liu, Shanghai (CN); Roberto Francisco-Yi Lu, Bellevue, WA (US); Haidong Wu, Kunshan (CN); Hui Xiao, Kunshan (CN)

(73) Assignees: Tyco Electronics (Shanghai) Co. Ltd., Shanghai (CN); Kunshan League Automechanism Co., Ltd., Kunshan (CN); Tyco Electronics Polska Sp. z.o.o., Warsaw (PL); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/170,436

(22) Filed: Oct. 25, 2018

(65) Prior Publication Data
US 2019/0119052 A1    Apr. 25, 2019

(30) Foreign Application Priority Data

Oct. 25, 2017   (CN) .......................... 2017 1 1007227

(51) Int. Cl.
B65G 65/38    (2006.01)
B65G 15/30    (2006.01)
B65G 47/14    (2006.01)

(52) U.S. Cl.
CPC ............. *B65G 65/38* (2013.01); *B65G 15/30* (2013.01); *B65G 47/1471* (2013.01)

(58) Field of Classification Search
CPC ........ B65G 65/38; B65G 15/30; B65G 47/12; B65G 47/14; B65G 47/1407; B65G 47/1471; B65G 47/1492
(Continued)

(56) References Cited

U.S. PATENT DOCUMENTS 2,577,926 A * 12/1951 Stiles ..................... B65G 23/44
                                                    198/313
5,143,506 A *  9/1992 Sticht ................. B65G 47/1471
                                                    414/421
(Continued)

*Primary Examiner* — William R Harp
(74) *Attorney, Agent, or Firm* — Barley Snyder

(57) ABSTRACT

A feeding system comprises a hopper adapted to accommodate a plurality of different types of products, a conveyor belt positioned above the hopper and configured to convey the products, and a lifting mechanism adapted to lift the products in the hopper onto the conveyor belt. The lifting mechanism includes a transferring belt circulating around an annular path and a plurality of step plates evenly spaced along the annular path. The step plates are adapted to carry one or more of the products and the transferring belt is configured to drive the step plates to circulate around the annular path so as to lift the products from the hopper onto the conveyor belt.

20 Claims, 2 Drawing Sheets

(58) Field of Classification Search
USPC .... 198/396, 397.01, 397.02, 397.03, 397.06, 198/550.5, 550.9
See application file for complete search history.

(56) References Cited

U.S. PATENT DOCUMENTS

| | | | | |
|---|---|---|---|---|
| 5,314,055 A | * | 5/1994 | Gordon | B25J 9/1697 198/395 |
| 2018/0148272 A1 | * | 5/2018 | Wagner | B65G 47/12 |

* cited by examiner

FEEDING SYSTEM

CROSS-REFERENCE TO RELATED APPLICATION

This application claims the benefit of the filing date under 35 U.S.C. § 119(a)-(d) of Chinese Patent Application No. 201711007227.9, filed on Oct. 25, 2017.

FIELD OF THE INVENTION

The present invention relates to a feeding system and, more particularly, to a feeding system for feeding product components.

BACKGROUND

In electronics manufacturing, it is necessary to mount various product components, such as electronic components, various chips, or semi-finished products, onto a circuit board. A feeding system is often used to feed the product components to improve assembly efficiency. The feeding system includes a hopper, a vibration tray, and a conveyor belt. The hopper is used to accommodate the products. The products fall from a discharge port of the hopper onto the vibration tray, which vibrates to change posture of the products so that the products are in an identifiable posture. The products are transferred by the conveyor belt to a pick-up station of a manipulator.

The products discharged from the hopper, however, are easily entangled and are difficult to separate. The products often accumulate on the vibration tray or the conveyor belt, which reduces the feeding efficiency of the products.

SUMMARY

A feeding system comprises a hopper adapted to accommodate a plurality of different types of products, a conveyor belt positioned above the hopper and configured to convey the products, and a lifting mechanism adapted to lift the products in the hopper onto the conveyor belt. The lifting mechanism includes a transferring belt circulating around an annular path and a plurality of step plates evenly spaced along the annular path. The step plates are adapted to carry one or more of the products and the transferring belt is configured to drive the step plates to circulate around the annular path so as to lift the products from the hopper onto the conveyor belt.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
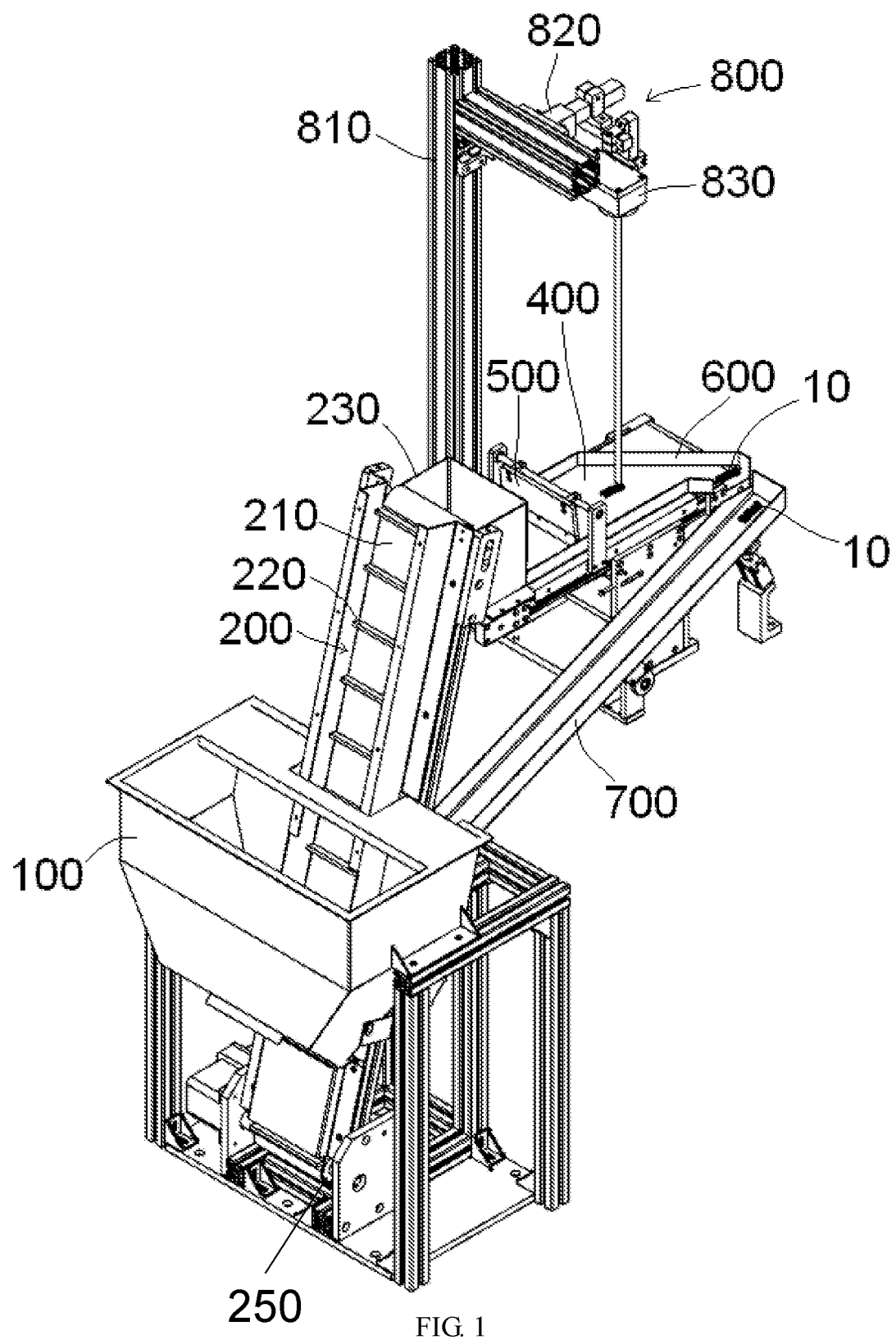
FIG. 1 is a perspective view of a feeding system according to an embodiment.

Exemplary embodiments of the present disclosure will be described hereinafter in detail with reference to the attached drawings, wherein like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Figure 2:
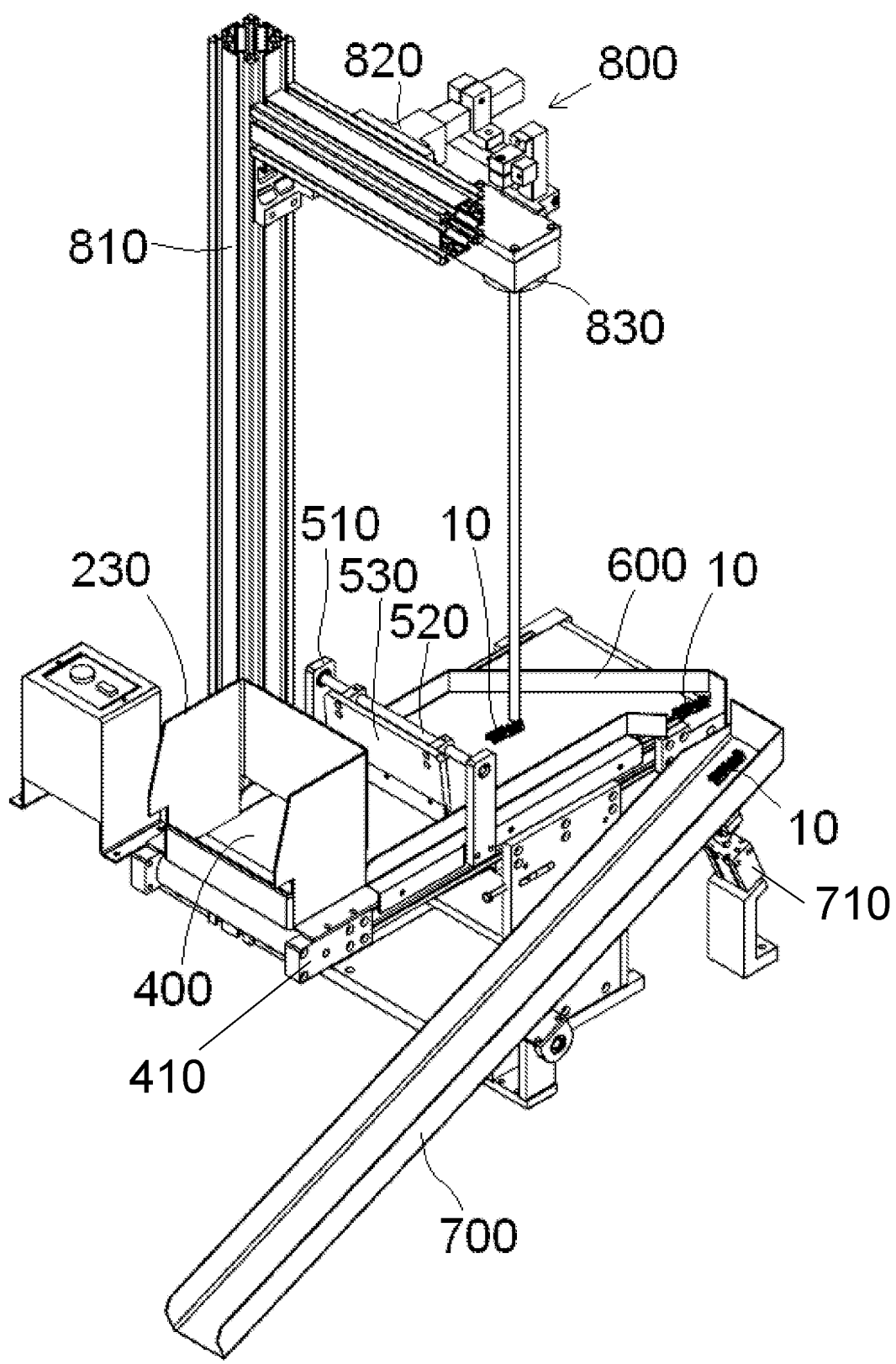
FIG. 2 is a perspective view of a portion of the feeding system of FIG. 1.

A feeding system according to an embodiment, as shown in FIGS. 1 and 2, includes a hopper 100, a conveyor belt 400, and a lifting mechanism 200. The hopper 100 is adapted to accommodate a variety of different types of products 10, for example, electronic components, various chips, semi-finished products, and the like. The conveyor belt 400 is located above the hopper 100 and configured to convey the products 10. The lifting mechanism 200 is adapted to lift the products 10 in the hopper 100 onto the conveyor belt 400.

The lifting mechanism 200, as shown in FIG. 1, includes a transferring belt 210 and a plurality of step plates 220. The transferring belt 210 circulates around an annular path. The plurality of step plates 220 are evenly spaced along the annular path of the transferring belt 210, i.e., arranged in a stair manner. Each step plate 220 is adapted to carry one or more product 10 from the hopper 100. The transferring belt 210 is used to drive the step plates 220 to circulate around the annular path to lift the products 10 carried on the step plates 220 onto the conveyor belt 400. As shown in FIG. 1, when the step plate 220 is moved to the top of the lifting mechanism 200, the products 10 carried on the step plate 220 fall automatically onto the conveyor belt 400 by gravity. The lifting mechanism 200 further includes a roller 250 on which the transferring belt 210 is tensioned and which is rotatable about its axis to drive the transferring belt 210 to move along the annular path.

As shown in FIG. 1, the transferring belt 210 is disposed obliquely with respect to a horizontal plane such that an angle of less than 90 degrees is formed between the transferring belt 210 and the horizontal plane. The step plates 220 are parallel to a width direction of the transferring belt 210 and perpendicular to a surface of the transferring belt 210. Thus, it may be ensured that the products 10 carried on the step plates 220 will not slip down.

In order to prevent the products 10 carried on the step plates 220 from slipping down, the lifting mechanism 200 further includes an outer cover 230 mounted outside the transferring belt 210 and the step plates 220 as shown in FIGS. 1 and 2. It should be noted that, in FIGS. 1 and 2, only a portion of the outer cover 230 is shown in order to show the transferring belt 210 and the step plates 220 therein.

The feeding system, as shown in FIGS. 1 and 2, further includes a product posture filter 500 adapted to change postures of at least some of the products 10 on the conveyor belt 400 such that it is possible for the at least some of the products 10 to change from an unidentifiable posture, which refers to a posture that cannot be identified by a vision system 800 into an identifiable posture, which refers to a posture that may be identified by the vision system 800.

The product posture filter 500, as shown in FIG. 2, includes a flexible stopper 530 that spans the conveyor belt 400. There is a predetermined distance between the flexible stopper 530 and the surface of the conveyor belt 400. When one product 10 is in the identifiable posture, a height of the product 10 is equal to or less than the predetermined distance so that the product 10 is not blocked by the flexible stopper 530 and may smoothly pass through the flexible stopper 530. When one product 10 is in the unidentifiable posture, a height of the product 10 is greater than the predetermined distance such that the product 10 is blocked by the flexible stopper 530 and flipped from the unidentifiable posture into the identifiable posture under a force applied by the flexible stopper 530.

The flexible stopper 530 is movable in a vertical direction such that the distance between the flexible stopper 530 and the surface of the conveyor belt 400 is adjustable. In this way, the product posture filter 500 is applicable to different products 10. In an exemplary embodiment, the flexible stopper 530 may be a flexible brush made of a plurality of flexible hairs. In another embodiment, the flexible stopper 530 may be a flexible belt.

The product posture filter 500, as shown in FIG. 2, further includes a pair of support columns 510 disposed on a pair of opposite sides of the conveyor belt 400 and a crossbar 520 disposed on the pair of support columns 510. The flexible stopper 530 is rotatably coupled to the crossbar 520.

The feeding system further includes a vibration generator 410 adapted to drive the conveyor belt 400 to vibrate in at least one direction so as to change the postures of at least some of the products 10 on the conveyor belt 400 such that the at least some of the products 10 are changeable from the unidentifiable posture to the identifiable posture.

As shown in FIGS. 1 and 2, the feeding system further includes a vision system 800 adapted to identify positions and the postures of the products 10 on the conveyor belt 400. In an embodiment, the vision system 800 only identifies the positions and the postures of the products 10 in the identifiable posture, but does not identify the positions and the postures of the products 10 in the unidentifiable posture. In an exemplary embodiment, the identifiable posture of the products 10 includes a recumbent posture or a half-recumbent posture, and the unidentifiable posture includes an upright posture.

The vision system 800, as shown in FIGS. 1 and 2, includes a vertical moving mechanism 810, 820 and a camera 830 mounted on the vertical moving mechanism 810, 820. The vertical moving mechanism 810, 820 may drive the camera 830 to move up and down in the vertical direction to adjust the distance between the camera 830 and the products 10. The vertical moving mechanism 810, 820 includes a vertical support bar 810 on which a vertical sliding rail is disposed and a slider 820 slidably mounted on the vertical sliding rail and slidable up and down along the vertical sliding rail. The camera 830 is mounted on the slider 820 and is movable in the vertical direction with the slider 820. The feeding system further includes a manipulator adapted to pick up the products 10 in the identifiable posture from the conveyor belt 400 under guidance of the vision system 800.

The feeding system, as shown in FIGS. 1 and 2, further includes a sliding passage 700 disposed obliquely with respect to the horizontal plane and a guiding baffle 600 disposed obliquely with respect to a conveying direction of the conveyor belt 400. The guiding baffle 600 is adapted to direct the products 10 on the conveyor belt 400 into the sliding passage 700. When the products 10 on the conveyor belt 400 are directed into the sliding passage 700, the products 10 are slidable along the sliding passage 700 into the hopper 100 under gravity by a weight of each of the products 10.

In another embodiment, the feeding system further includes a vibrator 710 that drives the sliding passage 700 to vibrate to ensure that the products 10 in the sliding passage 700 are smoothly slidable into the hopper 100. Thus, even if the self-weights of the products 10 are insufficient to drive the products 10 to slide in the sliding passage 700, that is to say, even if the friction between the products 10 and the sliding passage 700 is greater than the sliding force generated by the weights of the products 10, it can be ensured that the products 10 will smoothly slide into the hopper 100.

In another exemplary embodiment, the conveyor belt 400 has a normal mode and a clear mode. When the conveyor belt 400 is in the normal mode, the conveyor belt 400 conveys the products 10 forward at a first speed. When the conveyor belt 400 is in the clear mode, the conveyor belt 400 conveys the products 10 forward at a second speed greater than the first speed so that the products 10 on the conveyor belt 400 may be quickly returned to the hopper 100 via the sliding passage 700, thereby quickly removing the products 10 remaining on the conveyor belt 400.

In an embodiment, the hopper 100 includes a housing and a drawer that is withdrawable from the housing to quickly remove the products 10 remaining in the hopper 100. Then new products 10 may be loaded.

What is claimed is:

1. A feeding system, comprising:
a hopper adapted to accommodate a plurality of different types of products;
a conveyor belt positioned above the hopper and configured to convey the products;
a vibration generator adapted to drive the conveyor belt to vibrate in at least one direction so as to change a posture of at least some of the products on the conveyor belt from an unidentifiable posture into an identifiable posture; and
a lifting mechanism adapted to lift the products in the hopper onto the conveyor belt.

2. The feeding system of claim 1, wherein the lifting mechanism includes:
a transferring belt circulating around an annular path and a plurality of step plates evenly spaced along the annular path, the step plates are adapted to carry one or more of the products and the transferring belt is configured to drive the step plates to circulate around the annular path so as to lift the products from the hopper onto the conveyor belt; and
a roller on which the transferring belt is tensioned and which is rotatable to drive the transferring belt to move along the annular path.

3. The feeding system of claim 2, wherein the transferring belt is disposed obliquely with respect to a horizontal plane such that an angle of less than 90 degrees is formed between the transferring belt and the horizontal plane.

4. The feeding system of claim 2, wherein the step plates are parallel to a width direction of the transferring belt and perpendicular to a surface of the transferring belt.

5. The feeding system of claim 1, further comprising a product posture filter adapted to change a posture of at least some of the products on the conveyor belt from an unidentifiable posture into an identifiable posture.

6. The feeding system of claim 5, further comprising a vision system including a camera adapted to identify a position and the posture of the products on the conveyor belt.

7. The feeding system of claim 6, wherein the vision system is adapted to only identify the position and the posture of the products in the identifiable posture.

8. The feeding system of claim 7, wherein the identifiable posture is a recumbent posture or a half-recumbent posture and the unidentifiable posture is an upright posture.

9. The feeding system of claim 6, further comprising a manipulator adapted to pick up the products in the identifiable posture from the conveyor belt under guidance of the vision system.

10. The feeding system of claim 1, further comprising a sliding passage disposed obliquely with respect to a horizontal plane and a guiding baffle disposed obliquely with respect to a conveying direction of the conveyor belt and adapted to direct the products on the conveyor belt into the sliding passage, and when the products on the conveyor belt are directed into the sliding passage, the products are each slidable along the sliding passage into the hopper by a weight of each of the products.

11. The feeding system of claim 1, wherein the hopper includes a housing and a drawer that is withdrawable from the housing to permit removal of the products remaining in the hopper.

12. A feeding system, comprising:
a hopper adapted to accommodate a plurality of different types of products;
a conveyor belt positioned above the hopper and configured to convey the products;
a lifting mechanism adapted to lift the products in the hopper onto the conveyor belt; and
a product posture filter adapted to change a posture of at least some of the products on the conveyor belt from an unidentifiable posture into an identifiable posture, the product posture filter including a flexible stopper which spans the conveyor belt such that there is a predetermined distance between the flexible stopper and a surface of the conveyor belt, when the product on the conveyor belt is in the identifiable posture a height of the product is equal to or less than the predetermined distance such that the product is not blocked by the flexible stopper and is allowed to pass through the flexible stopper, and when the product on the conveyor belt is in the unidentifiable posture a height of the product is greater than the predetermined distance such that the product is blocked by the flexible stopper and is flipped from the unidentifiable posture into the identifiable posture by the flexible stopper.

13. The feeding system of claim 12, wherein the flexible stopper is movable in a vertical direction such that the distance between the flexible stopper and the surface of the conveyor belt is adjustable and the product posture filter is applicable to different products.

14. The feeding system of claim 12, wherein the flexible stopper is a flexible brush made of a plurality of flexible hairs.

15. The feeding system of claim 12, wherein the product posture filter includes a pair of support columns disposed on a pair of opposite sides of the conveyor belt and a crossbar disposed on the pair of support columns, the flexible stopper is rotatably coupled to the crossbar.

16. The feeding system of claim 12, further comprising a vibration generator adapted to drive the conveyor belt to vibrate in at least one direction so as to change a posture of at least some of the products on the conveyor belt from an unidentifiable posture into an identifiable posture.

17. A feeding system comprising:
a hopper adapted to accommodate a plurality of different types of products;
a conveyor belt positioned above the hopper and configured to convey the products;
a lifting mechanism adapted to lift the products in the hopper onto the conveyor belt; and
a vision system including:
a camera adapted to identify at least one of a position or a posture of the products on the conveyor belt; and
a vertical moving mechanism having the camera mounted thereon, the vertical moving mechanism driving the camera to move up and down in a vertical direction to adjust a distance between the camera and the products.

18. The feeding system of claim 17, wherein the vertical moving mechanism includes a vertical support bar on which a vertical sliding rail is disposed and a slider which is slidably mounted on the vertical sliding rail and is slidable up and down along the vertical sliding rail, and the camera is mounted on the slider and is movable in the vertical direction with the slider.

19. A feeding system comprising:
a hopper adapted to accommodate a plurality of different types of products;
a conveyor belt positioned above the hopper and configured to convey the products;
a lifting mechanism adapted to lift the products in the hopper onto the conveyor belt;
a sliding passage disposed obliquely with respect to a horizontal plane and a guiding baffle disposed obliquely with respect to a conveying direction of the conveyor belt and adapted to direct the products on the conveyor belt into the sliding passage, and when the products on the conveyor belt are directed into the sliding passage, the products are each slidable along the sliding passage into the hopper by a weight of each of the products; and
a vibrator that drives the sliding passage to vibrate to ensure that the products in the sliding passage are slidable into the hopper.

20. A feeding system comprising:
a hopper adapted to accommodate a plurality of different types of products;
a conveyor belt positioned above the hopper and configured to convey the products;
a lifting mechanism adapted to lift the products in the hopper onto the conveyor belt; and
a sliding passage disposed obliquely with respect to a horizontal plane and a guiding baffle disposed obliquely with respect to a conveying direction of the conveyor belt and adapted to direct the products on the conveyor belt into the sliding passage, and when the products on the conveyor belt are directed into the sliding passage, the products are each slidable along the sliding passage into the hopper by a weight of each of the products,
wherein the conveyor belt has a normal mode in which the conveyor belt conveys the products forward at a first speed and a clear mode in which the conveyor belt conveys the products forward at a second speed greater than the first speed such that the products on the conveyor belt are returned to the hopper via the sliding passage.

* * * * *